US 8,453,291 B2

(12) United States Patent
Schrader et al.

(10) Patent No.: US 8,453,291 B2
(45) Date of Patent: Jun. 4, 2013

(54) WIPER LIFTER

(75) Inventors: Michael A. Schrader, Plain City, OH (US); Anthony J. Ferrito, Plain City, OH (US); Michael T. Binfet, Bellefontaine, OH (US); Takuji Ohara, Dublin, OH (US); James A. Loftus, Jr., Marysville, OH (US); Kozo Kusumoto, Dublin, OH (US); Joshua L. Morrow, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1167 days.

(21) Appl. No.: 12/341,508

(22) Filed: Dec. 22, 2008

(65) Prior Publication Data
US 2010/0154157 A1 Jun. 24, 2010

(51) Int. Cl.
*B60S 1/02* (2006.01)

(52) U.S. Cl.
USPC .............. 15/250.19; 15/257.01; 15/250.16

(58) Field of Classification Search
USPC .............. 15/250, 250.19, 250.16, 250.001, 15/250.202, 257.01
IPC .................................. B60S 1/04, 1/32, 1/38
See application file for complete search history.

(56) References Cited

U.S. PATENT DOCUMENTS

| | | | |
|---|---|---|---|
| 4,345,352 A | 8/1982 | Terabayashi | |
| 4,969,228 A * | 11/1990 | Edwards et al. | 15/250.19 |
| 5,101,531 A | 4/1992 | Edwards et al. | |
| 5,675,861 A * | 10/1997 | Ayers | 15/250.19 |
| 6,253,409 B1 | 7/2001 | Terai | |
| 2006/0196075 A1* | 9/2006 | Santhouse et al. | 34/96 |
| 2007/0050936 A1* | 3/2007 | Vogt | 15/250.04 |
| 2007/0262633 A1* | 11/2007 | Stoffer | 297/423.4 |

FOREIGN PATENT DOCUMENTS

JP 11034807 A * 2/1999

* cited by examiner

*Primary Examiner* — Joseph J Hail
*Assistant Examiner* — Henry Hong
(74) *Attorney, Agent, or Firm* — Gregory J. Burke; Emerson Thomson Bennett, LLC (57) ABSTRACT

A wiper lifter assembly includes a wiper ramp that lifts a wiper away from a wiper surface on a vehicle and a wiper contact member that is attached to an upper surface of the wiper ramp. The wiper contact member may act as a sound damper to greatly reduce the undesirable noise otherwise caused when the wiper contacts the wiper lifter assembly. The assembly may also include an isolation pad for attaching the assembly to the vehicle.

8 Claims, 8 Drawing Sheets

WIPER LIFTER

I. BACKGROUND OF THE INVENTION

A. Field of Invention

This invention pertains to the art of methods and apparatuses related to vehicle surface cleaning and more specifically to methods and apparatus related to windshield wipers.

B. Description of the Related Art

It is well known in the art to provide vehicles with devices commonly referred to as "windshield wipers" that are operated to clean and/or clear the front and sometimes the back window or windshield through which vehicle passengers look. Such windshield wipers are typically pivoted across a portion of the outer surface of the windshield where they clear or wipe the windshield surface to remove water, snow, ice or debris.

It is also well known to place windshield wipers in a non-use or "park" position when they are not being used. Often, the windshield wipers are positioned onto a wiper lifter, sometimes referred to as a ramp, to maintain the wiper in the parked position. Typically, placing the wiper onto the wiper lifter lifts the wiper away from the windshield and/or vehicle surface and thereby relieves unwanted pressure from the wiper.

Known wiper lifters are usually formed of two parts, a relatively soft base (typically formed of rubber) that seals the lifter to the vehicle and a harder skid pad (typically formed of a plastic) that the wiper contacts when it is placed into the parked position. U.S. Pat. No. 4,969,228 to Edwards et al. discloses such a two piece lifter construction.

While known two part wiper lifters generally work well for their intended purpose, they have a disadvantage. In particular, when wipers are parked onto known wiper lifters a loud "thunk" or "thud" noise occurs. This noise is undesirable.

Therefore, what is needed is a wiper lifter that supports a wiper in a park position and does so without the unwanted noise experienced with current wiper lifters.

II. SUMMARY OF THE INVENTION

According to one embodiment of the present invention, a wiper lifter assembly for a vehicle may comprise a wiper ramp formed substantially from a first material, the wiper ramp having an upper surface including a ramped portion for lifting a wiper of an associated vehicle away from a wiping surface of the vehicle; and a wiper contact member supported on an upper surface of the wiper ramp such that the wiper of an associated vehicle contacts the wiper contact member before contacting any other component of the wiper lifter assembly, the wiper contact member including a cushioning layer made substantially from a second material that is softer than the first material.

According to another embodiment of the invention, a wiper lifter assembly may comprise: (A) an isolation pad that: (1) has a first surface for use in contacting an associated vehicle; and (2) has a second surface; (B) a wiper ramp that: (1) has a first surface that contacts the second surface of the isolation pad; (2) has a second surface that lifts an associated wiper away from a wiper surface on the associated vehicle; and, (3) has a groove; and, (C) a wiper contact member that: (1) has a first surface that is attached to the wiper ramp within the groove; and, (2) has a second surface that is contacted by the associated wiper before any other surface of the wiper lifter assembly is contacted by the associated wiper.

According to another embodiment of the invention, a wiper lifter assembly may comprise: (A) an isolation pad that: (1) has a first surface for use in contacting an associated vehicle; and, (2) has a second surface; (B) a wiper ramp that: (1) has a first surface that contacts the second surface of the isolation pad; (2) has a second surface that lifts an associated wiper away from a wiper surface on the associated vehicle; and, (3) has a third surface; and, (C) a wiper contact member that: (1) has a first layer that: (a) has a first surface that is attached to the third surface of the wiper ramp; and (b) a second surface; and, (2) has a second layer that: (a) has a first surface that is attached to the second surface of the first layer; and, (b) a second surface that is contacted by the associated wiper before any other surface of the wiper lifter assembly is contacted by the associated wiper.

One advantage of this invention is that a wiper lifter supports a wiper in a park position and does so without the unwanted noise experienced with current wiper lifters.

Another advantage of this invention is that a wiper lifter is easy to assemble.

Still other benefits and advantages of the invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
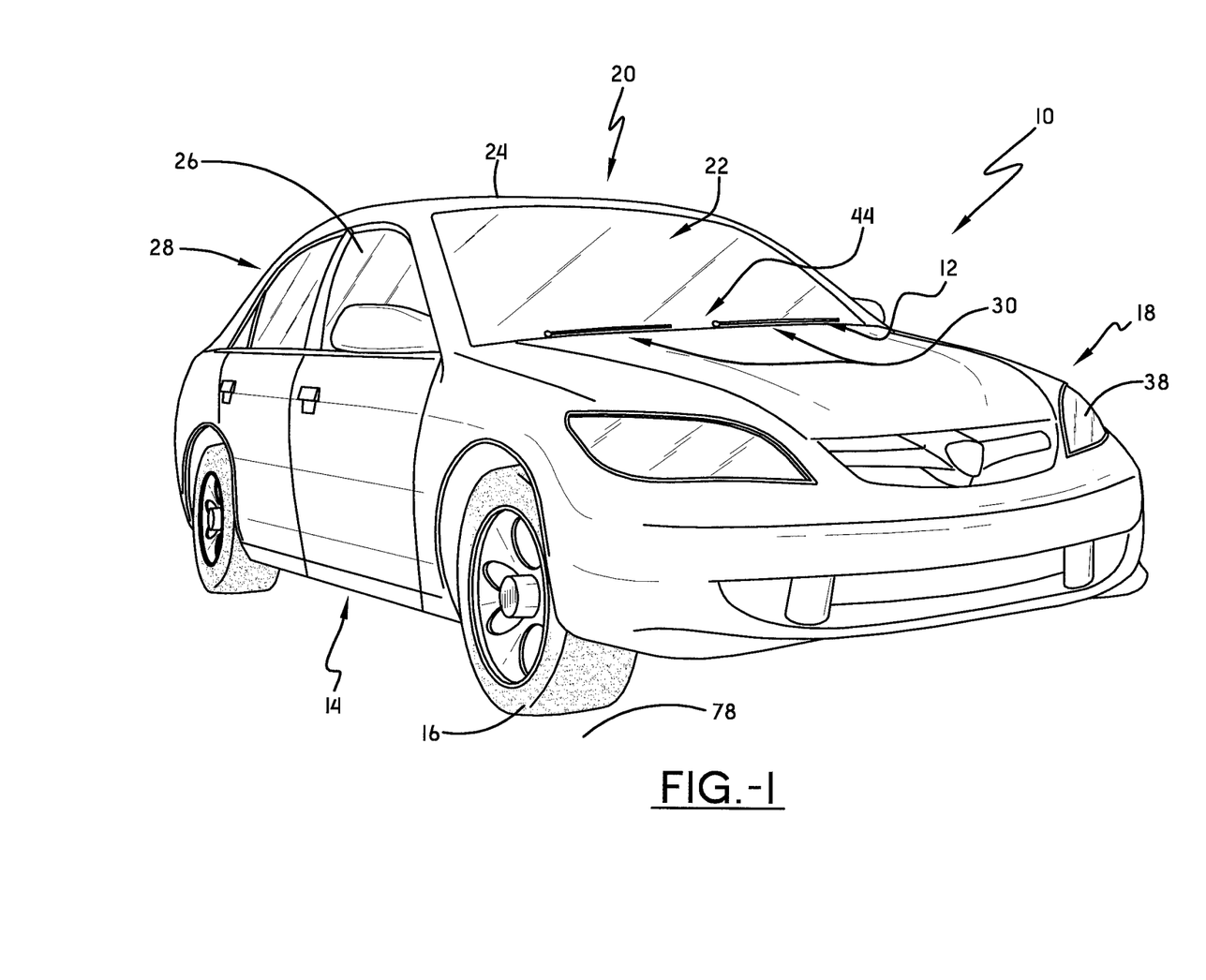
FIG. 1 is a front perspective view of a sedan.
Figure 2:
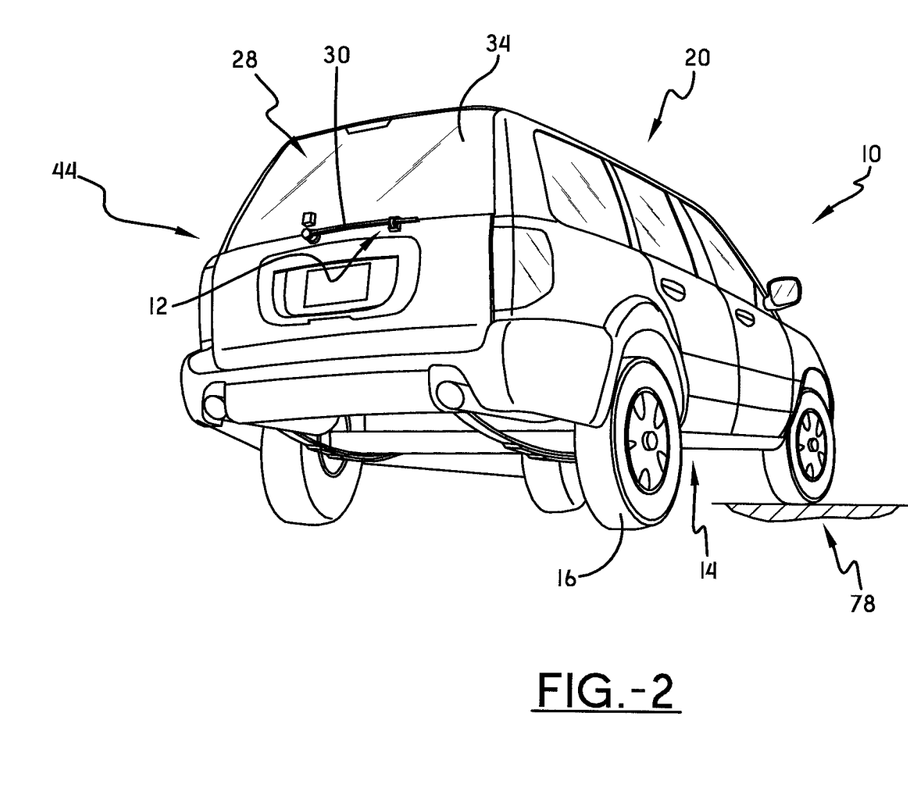
FIG. 2 is a rear perspective view of a sports utility vehicle (SUV).

Referring now to the drawings wherein the showings are for purposes of illustrating embodiments of the invention only and not for purposes of limiting the same, and wherein like reference numerals are understood to refer to like components, FIGS. 1 and 2 each show a vehicle 10 that may be equipped with a wiper lifter assembly 12, according to one embodiment of this invention. While the vehicle 10 shown in FIG. 1 is a sedan and the vehicle shown in FIG. 2 is a sports utility vehicle (SUV), it is to be understood that the wiper lifter assembly 12 of this invention will work with any vehicle including, for some non-limiting examples, cars, trucks, motorcycles, aircraft and sea-faring vessels. The vehicle 10 may include a frame 14, one or more ground engaging wheels 16 mounted to the frame 14, and a locomotion source 18, mounted to the frame 14, for use in providing locomotion for the vehicle 10. The locomotion source could be of any type chosen with the sound judgment of a person of skill in the art including, for some non-limiting examples, an internal combustion engine (ICE), an electric motor, and a so called "hybrid" which combines an ICE with an electric motor.

With continuing reference to FIGS. 1-2, each vehicle 10 may also have a passenger compartment 20 which houses one or more passengers as is well known in the art. The passenger compartment 20 may be bordered by a front windshield 22, a roof 24, one or more side windows 26 and a rear windshield or window 28. The vehicle also may include at least one wiper assembly 30, which is used to wipe and thereby clean or clear a wiping surface 34 on the vehicle 10. While the wiper assembly 30 will be described in further detail below, it is to be understood that this invention can be used with any wiper assembly chosen with the sound judgment of a person of skill in the art. Similarly, while the wiping surface 34 shown in FIG. 1 is the outer surface of the front windshield 22 and the wiping surface 34 shown in FIG. 2 is the outer surface of the rear windshield 28, it is to be understood that this invention can be used with a wiper assembly used to wipe any vehicle wiping surface chosen with the sound judgment of a person of skill in the art. Some additional non-limiting examples of vehicle wiping surfaces include the exterior surfaces of the side windows 26 and the exterior surface of an illumination device such as a headlight 38.

Figure 3:
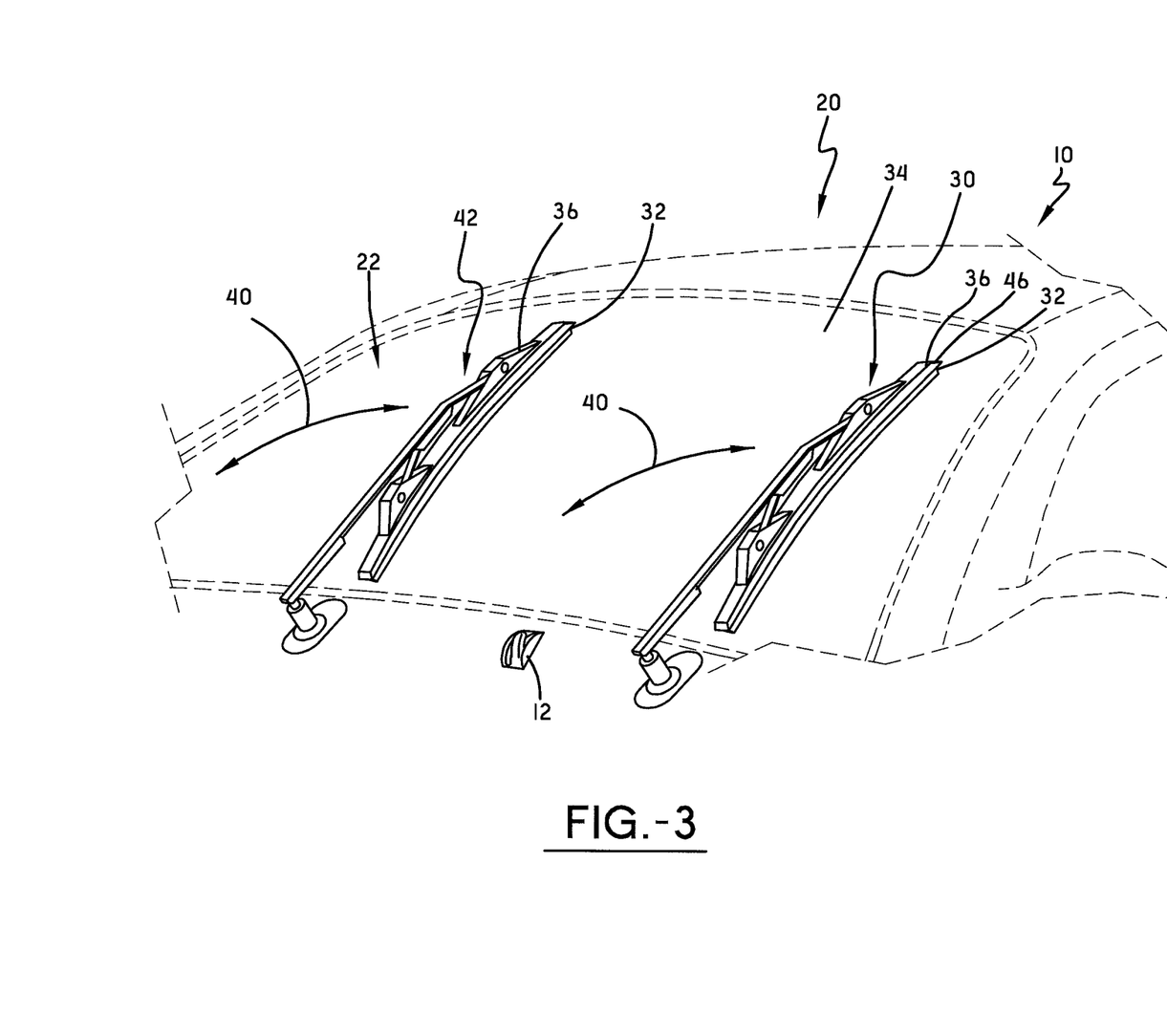
FIG. 3 is a perspective view of the front windshield of a vehicle illustrating the operation of a windshield wiper assembly.
Figure 4:
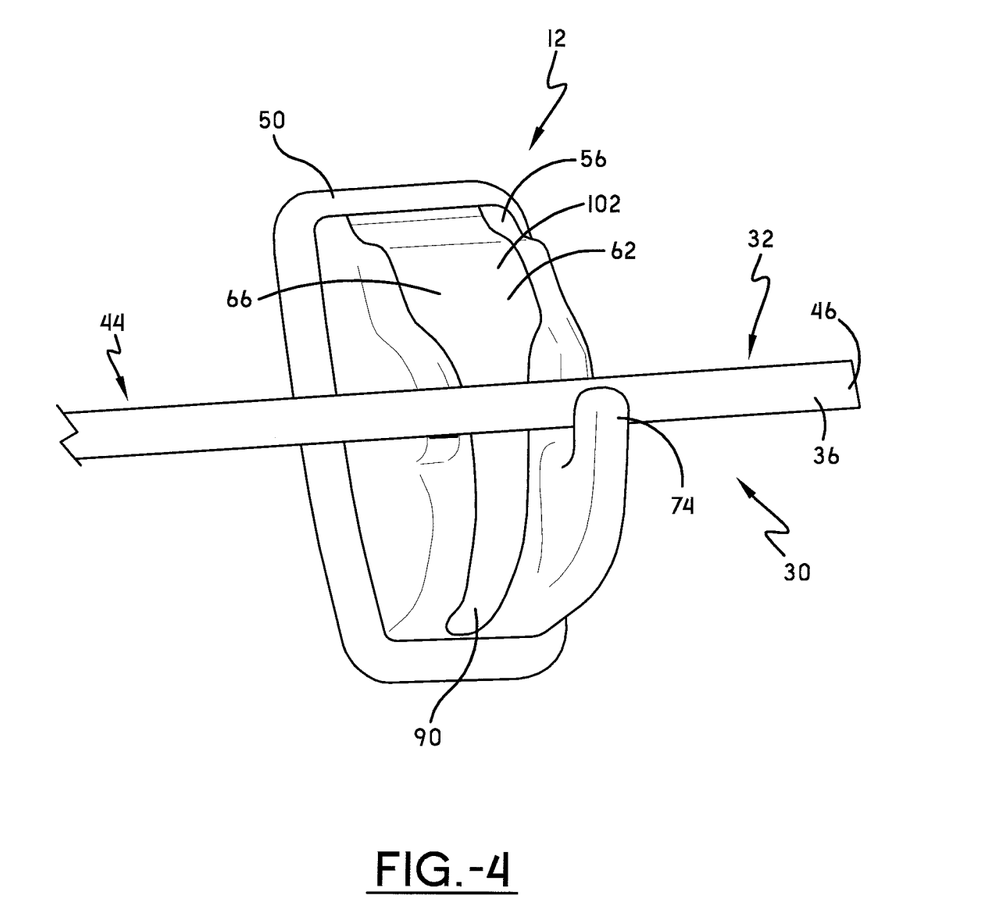
FIG. 4 is a perspective view of a wiper parked onto a wiper lifter assembly according to one embodiment of this invention.
Figure 5:
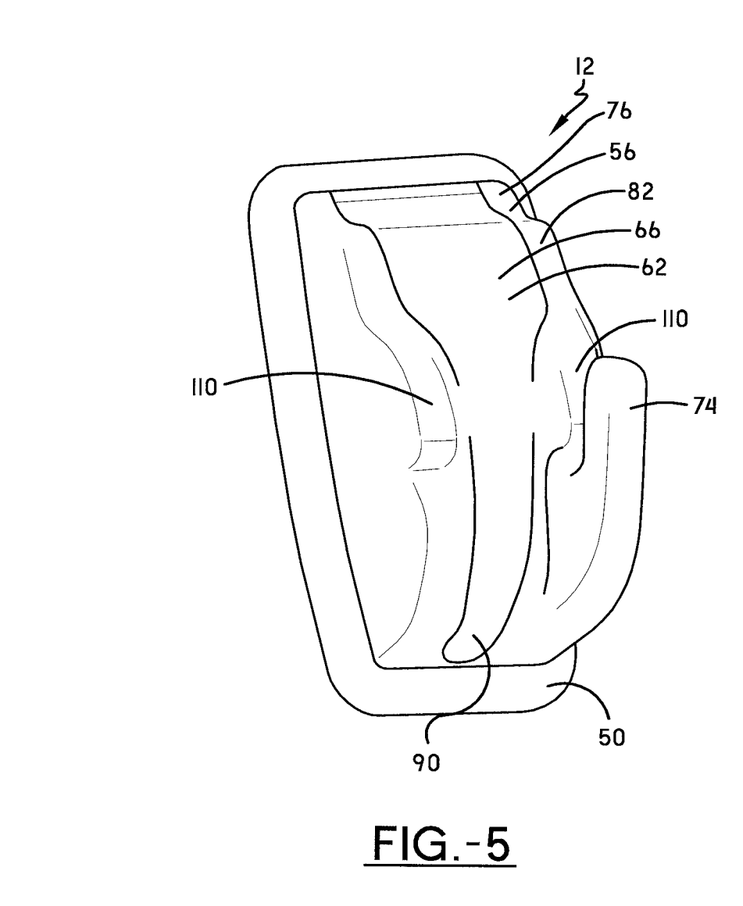
FIG. 5 is a perspective view of the wiper lifter assembly shown in FIG. 4 without the wiper.
Figure 6:
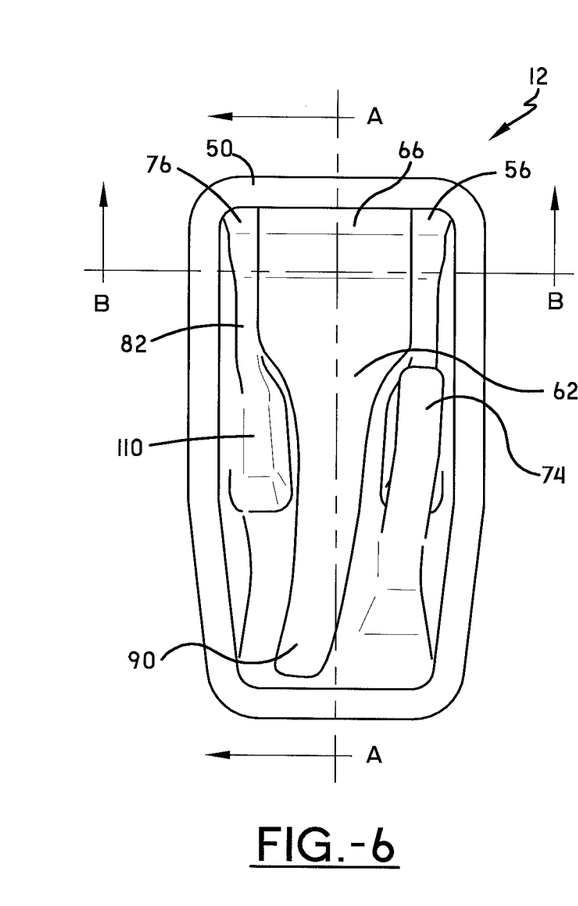
FIG. 6 is a plan view of the wiper lifter assembly shown in FIG. 5.

With reference now to FIGS. 1-3, the wiper assembly 30 may include a wiper blade 32, which contacts and wipes the wiping surface 34, and a wiper blade mount 36 to which the wiper blade 32 is attached and supported. The wiper blade mount 36 may be pivotally connected to the vehicle 10 so that the wiper blade 32 may move within a predetermined angle 40 on wiping surface 34. The wiper assembly 30 may be in a first use or extended position 42 (shown in FIG. 3) or a second non-use or parked position 44 (shown in FIGS. 1 and 2). When the wiper assembly 30 is automatically or manually activated, wiper assembly 30 may move from the parked position 44 to the extended position 42. In the extended position 42, wiper assembly 30 may move within the predetermined angle 40 in a reciprocating motion. When the wiper assembly 30 is automatically or manually deactivated, the wiper assembly 30 may move from the extended position 42 to the parked position 44, where the wiper assembly 30 is positioned or parked on the wiper lifter assembly 12. While the parked position 44 shown is below the wiping surface 34, it should be understood that the parked position 44 can be at any location chosen with the sound judgment of a person of skill in the art. As the apparatuses and methods for moving wiper assemblies are well known in the art, details will not be provided here.

With reference now to FIGS. 1-4, the wiper lifter assembly 12 will now be described. First it should be noted that while the wiper lifter assembly shown is used to support a cantilevered end 46 of the wiper assembly 30, it may be positioned to support any portion of the wiper assembly chosen with the sound judgment of a person of skill in the art. Also, while one wiper lifter assembly 12 is shown for use with one wiper assembly 30, it should be understood that multiple wiper lifter assemblies 12 may be used with a single wiper assembly 30. The wiper lifter assembly 12 may include an isolation pad 50, a wiper ramp 56, and a "cushioning layer" defined by a wiper contact member 62.

With reference to FIGS. 1-6, isolation pad 50 may form a foundation or base for the wiper lifter assembly 12 and may be attached to vehicle 10 near wiping surface 34 in any manner chosen with the sound judgment of a person of skill in the art. The isolation pad 50 may form a watertight seal or barrier between the wiper lifter assembly 12 and the vehicle 10. The wiper lifter assembly 12 may also be integrated into a specific body panel on the vehicle 10 or passenger compartment 20. The integration may prevent moisture from entering between the wiper lifter assembly 12 and the vehicle 10, thus preventing harmful oxidation and damage. The integration of wiper lifter assembly 12 may further provide a more secure attachment to vehicle 10. In one embodiment, a body panel may be manufactured with a cavity or recess sized to receive wiper lifter assembly 12. Isolation pad 50 may have any shape chosen with sound judgment by a person skilled in the art. In one embodiment, the isolation pad 50 may be generally rectangular in shape, as shown. In other embodiments, the isolation pad 50 may be circular or elliptical. The isolation pad 50 may be formed of any material chosen with sound judgment by a person skilled in the art. In one embodiment, isolation pad 50 may be substantially formed of a relatively soft material, such as rubber.

With reference now to FIGS. 3-8, the isolation pad 50 may have a first surface 52 operatively connected to vehicle 10 and a second surface 54 operatively connected to wiper ramp 56. First surface 52 may form a secure connection between the vehicle 10 and isolation pad 50. First surface 52 may also form a watertight seal between isolation pad 50 and vehicle 10. In one embodiment, the isolation pad 50 may be attached to the vehicle 10 by a mechanical fastener 70. Mechanical fastener 70 can be a bolt, screw, rivet, or any other fastener chosen with the sound judgment of a person of skill in the art. In another embodiment, the first surface 52 may use an adhesive to attach to the vehicle 10.

With continuing reference to FIGS. 3-8, the wiper ramp 56 determines the location and orientation of wiper assembly 30 in relation to vehicle 10 when the wiper assembly 30 is in the parked position 44. The wiper ramp 56 may be formed of any material chosen with sound judgment by a person skilled in the art. In one embodiment, the wiper ramp 56 may be substantially formed of a relatively hard material, such as plastic. The wiper ramp 56 may have a first surface 58, which may operatively connect to second surface 54 of the isolation pad 50, a second surface 60, which may lift wiper assembly 30 away from wiping surface 34, and a third surface 84, which may operatively connect to wiper contact member 62. The first surface 58 of the wiper ramp 56 may contact the second surface 54 of the isolation pad 50 and, in one embodiment, may attach to isolation pad 50. Any attachment method chosen with sound judgment by a person skilled in the art may be used to connect isolation pad 50 to the wiper ramp 56. In one embodiment, an adhesive may be used to connect the first surface 58 of the wiper ramp 56 to the second surface 54 of the isolation pad 50. In another embodiment, mechanical fastener 70 attaches first surface 58 of the wiper ramp 56 to the second surface 54 of the isolation pad 50. In still another embodiment, the attachment means between first surface 58 and second surface 54 creates a water-tight connection.

With continuing reference to FIGS. 3-8, the second surface 60 of the wiper ramp 56, which lifts wiper assembly 30 away from wiping surface 34, may have a leading edge 76 located near wiping surface 34. Leading edge 76 may take any shape chosen with the sound judgment of a person skill in the art. Leading edge 76 may be the portion of second surface 60 where the wiper assembly 30 first contacts the wiper lifter assembly 12. Second surface 60 may also have a contoured edge 82 located near leading edge 76. In one embodiment, contoured edge 82 is located adjacent to leading edge 76. Contoured edge 82 may also take any shape chosen with the sound judgment of a person of skill in the art. Leading edge 76 may form a surface leading from wiping surface 34 to contoured edge 82. Second surface 60 of wiper ramp 56 may have a lifter holder 74 located near contoured edge 82. In one embodiment, lifter holder 74 may be located adjacent to contoured edge 82. Lifter holder 74 may have any shape chosen with the sound judgment of a person of skill in the art. In one embodiment, lifter holder 74 may be a raised or elevated portion on second surface 60. In other embodiments, lifter holder 74 may have a general J-shape, C-shape, or U-shape. The lifter holder 74 may secure wiper assembly 30 to wiper lifter assembly 12 in the parked position 44.

Still referring to FIGS. 3-8, second surface 60 of wiper ramp 56 may have a ridge 110 near the contoured edge 82. In one embodiment, ridge 110 may be located adjacent to contoured edge 82 and on the same latitudinal axis as the lifter holder 74. Ridge 110 may have any shape chosen with the sound judgment of a person of skill in the art. In one embodiment, ridge 110 may be a raised or elevated portion on second surface 60. Second surface 60 may have more than one ridge 110. In one embodiment, second surface 60 has two ridges 110. Contoured edge 82 may form a surface extending from leading edge 76 to ridge 110 and lifter holder 74. Second surface 60 may also have a trailing edge 90 located near ridge 110 and lifter holder 74. In one embodiment, trailing edge 90 may be located adjacent to ridge 110 and lifter holder 74. Trailing edge 90 may have any shape chosen with the sound judgment of a person of skill in the art. In one embodiment, trailing edge 90 is a generally sloping surface extending from ridge 110 and lifter holder 74 to vehicle 10. In another embodiment, wiper assembly 30 does not contact trailing edge 90.

With reference now to FIGS. 4-8, third surface 84 of wiper ramp 56 may be sized and positioned in any manner chosen with the sound judgment of a person of skill in the art. In one embodiment, the third surface 84 may be centered along the longitudinal axis of the wiper ramp 56. Third surface 84 may be located below the second surface 60 of the wiper ramp 56. In one embodiment, the third surface 84 may lie in a depression or groove 88 defined by a bottom 86 and sides 108. Bottom 86 may be located below second surface 60. Sides 108 may join with the bottom 86 and may be substantially perpendicular to the second surface 60. The groove 88 may have a width that is relatively wider at the leading edge 76 of the wiper ramp 56 and then becomes relatively narrower at the trailing edge 90 of the wiper ramp 56. Third surface 84 may receive wiper contact member 62.

With continuing reference to FIGS. 4-8, the wiper contact member 62 may act as a sound damper to greatly reduces the "thunk" or "thud" noise known in the prior art. Wiper contact member 62 may have any position chosen with the sound judgment of a person of skill in the art to maximize the sound damping characteristic of the wiper lifter assembly 12. In one embodiment, wiper contact member 62 may be positioned so that wiper assembly 30 contacts wiper contact member 62 before any other portion of wiper lifter assembly 12. Wiper contact member 62 may have any overall thickness T1 chosen with sound judgment of a person skilled in the art. In one embodiment, overall thickness T1 may be from 0.5 to 5.0 millimeters. In another embodiment, overall thickness T1 may be from 1.0 to 2.0 millimeters. In a more specific embodiment, overall thickness T1 may be approximately 1.6 millimeters. Wiper contact member 62 may have a first surface 64 that operatively connects to the third surface 84 of the wiper ramp 56 and a second surface 66. First surface 64 may attach to the third surface 84 of the wiper ramp 56 in any manner chosen with the sound judgment of a person of skill in the art. In one embodiment, first surface 64 may be in substantially permanent contact with third surface 84. In another embodiment, first surface 64 may attach to the third surface 84 with an adhesive. In still another embodiment, groove 88 may receive the wiper contact member 62, and first surface 64 may attach to bottom 86.

With reference now to FIGS. 3-8, second surface 66 of wiper contact member 62 may receive wiper assembly 30 when wiper assembly 30 moves from the extended position 42 to the parked position 44. Second surface 66 may be located near leading edge 76 of wiper ramp 56. In one embodiment, second surface 66 is adjacent to leading edge 76. Wiper contact member 62 may extend beyond at least a portion of wiper ramp 56 by an extending thickness T2. In one embodiment, second surface 66 of wiper contact member 62 may extend above at least a portion of second surface 60 of wiper ramp 56 by extending thickness T2. In another embodiment, second surface 66 may extend beyond leading edge 76 by extending thickness T2. In still another embodiment, second surface 66 may extend beyond second surface 60 along leading edge 76 and contoured edge 82 by extending thickness T2. Extending thickness T2 may be any thickness chosen with sound judgment of a person skilled in the art. In one embodiment, extending thickness T2 may be from 0 to 2.0 millimeters. In another embodiment, extending thickness T2 may be from 0.05 to 0.15 millimeters. In a more specific embodiment, extending thickness T2 may be approximately 0.1 millimeters. The ratio between extending thickness T2 and overall thickness T1 (for example, T2/T1) of wiper contact member 62 may be any ratio from zero to one. In one embodiment, extending thickness T2 is substantially equal to overall thickness T1, thus resulting in a T2/T1 ratio substantially equal to 1. In another embodiment, T2 is substantially equal to 0 (as shown in FIG. 9), thus resulting in a T2/T1 ratio substantially equal to 0. In a more specific embodiment, T1 may be approximately 1.6 millimeters and T2 may be approximately 0.1 millimeters, thus resulting in a T2/T1 ratio approximately equal to 0.0625. In each of these embodiments, wiper assembly 30 may first contact second surface 66 before any other portion of wiper lifter assembly 12 when moving from extended position 42 to parked position 44.

Figure 7:
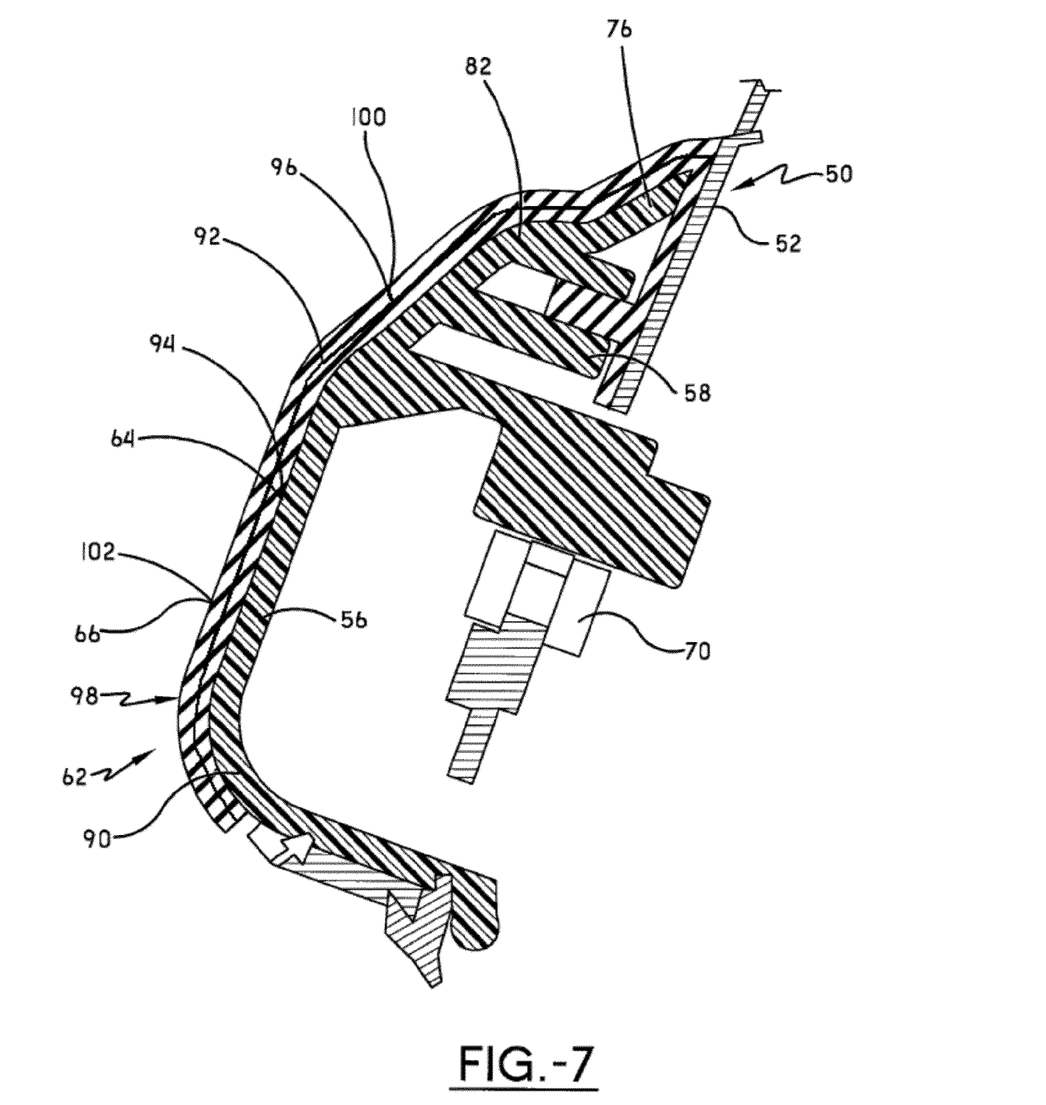
FIG. 7 is a cross-sectional view of the wiper lifter assembly taken along the line A-A in FIG. 6.
Figure 8:
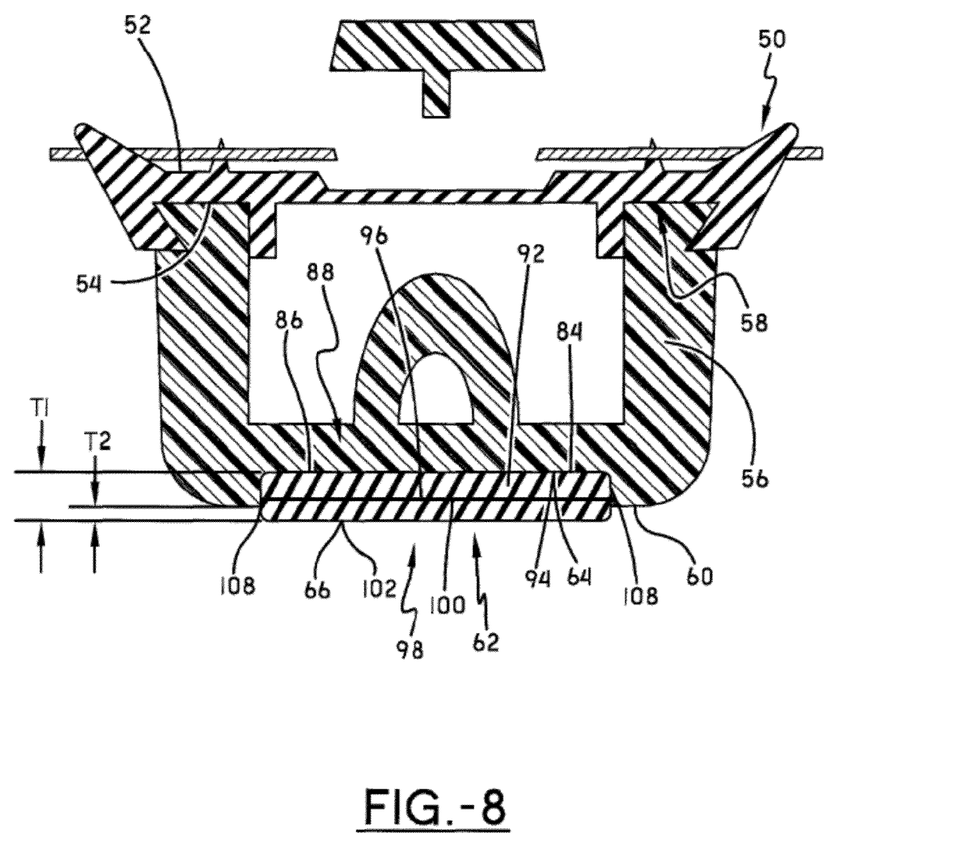
FIG. 8 is a cross-sectional view of the wiper lifter assembly taken along the line B-B in FIG. 6.
Figure 9:
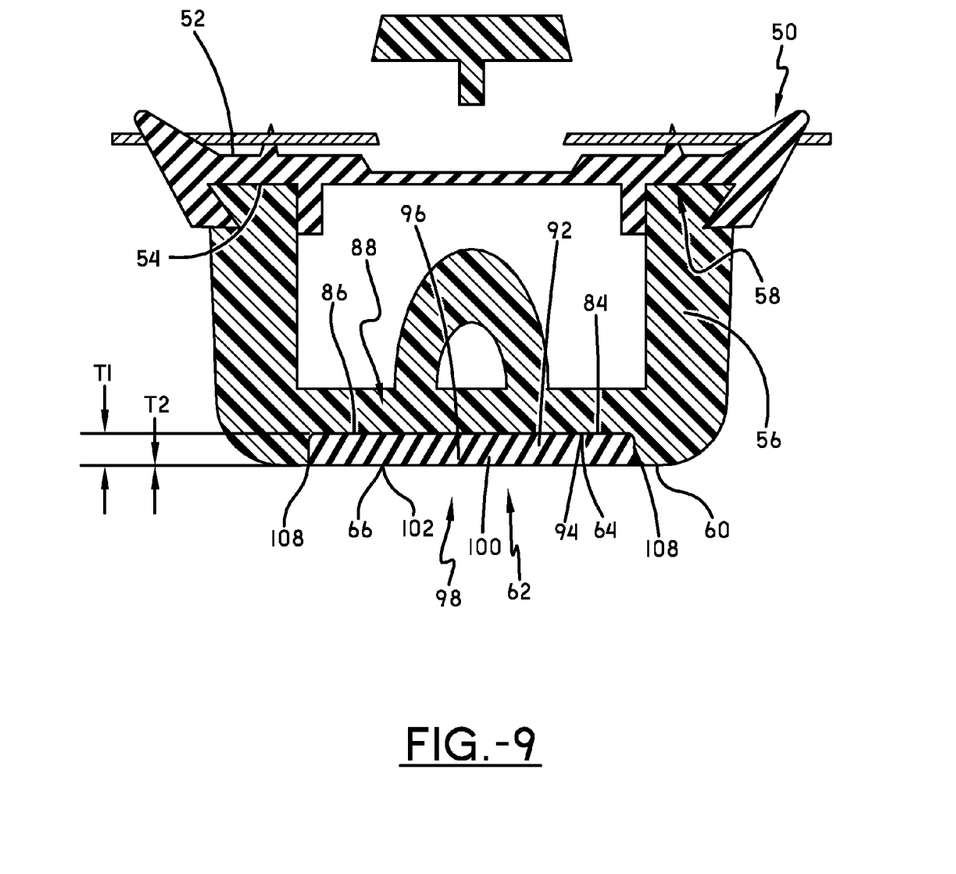
FIG. 9 is a cross-sectional view analogous to FIG. 8, but showing an extending thickness T2 reduced to zero.

With reference now to FIGS. 7-8, the wiper contact member 62 may be formed in any arrangement and of any material or materials chosen with the sound judgment of a person skilled in the art. In one embodiment, the wiper contact member 62 may be a single homogeneous component substantially formed of any sound absorbing material, such as a porous material formed of matted or spun fibers. In another embodiment, the wiper contact member 62 may be formed of two or more distinct non-homogeneous components. In a more specific embodiment, the wiper contact member 62 may be formed of two or more layers, such as a first layer 92 and a second layer 98. The first layer 92 may have a first surface 94, which defines at least a portion of first surface 64 of the wiper contact member 62 and a second surface 96. The second layer 98 may have a first surface 100 that operatively connects to the second surface 96 of the first layer 92 and a second surface 102, which defines at least a portion of second surface 66 of the wiper contact member 62. The use of multiple components for the wiper contact member 62 allows selection of materials best suited for their purpose. In one embodiment, first layer 92 may be substantially formed of a sound absorbing material such as acrylic foam, and second layer 98 may be substantially formed of a coating or film that may have a low coefficient of friction such as slip tape, which reduces the surface friction between wiper assembly 30 and second surface 66 of wiper contact member 62. In another embodiment, first layer 92 may be substantially formed of acrylic foam with an adhesive on at least a portion of first surface 94 and at least a portion of second surface 96.

With reference now to all the FIGURES, the process of parking the wiper assembly 30 on the wiper lifter assembly 12 will now be described. When wiper assembly 30 moves from the first use or extended position 42 to the second non-use or parked position 44, wiper assembly 30 may contact wiper lifter assembly 12. In one embodiment, wiper assembly 30 may first contact leading edge 76 of wiper ramp 56. In a more specific embodiment, wiper assembly 30 may first contact second surface 66 of wiper contact member 62 at leading edge 76. As wiper assembly starts to slide on second surface 66, leading edge 76 may lift wiper assembly away from wiping surface 34. As wiper assembly 30 continues to move towards the parked position 44, contoured edge 82 may continue to lift wiper assembly 30 away from wiping surface 34. Wiper assembly 30 may then contact ridge 110 as wiper assembly 30 continues to move towards the parked position 44. As shown in the perspective views of FIGS. 5 and 6, the ridge 110 extends above the surface 60 (referenced by countered edge 82) and above the second surface 66 of the wiper contact member 62. Ridge 110 may thus move or lift wiper assembly 30 away from and out of contact with second surface 66. Wiper contact member 62 could prematurely degrade if wiper assembly 30 were to remain in contact with second surface 66 in the parked position 44. Thus, ridge 110 may prolong the life of wiper contact member 62. Ridge 110 may also move or direct the wiper assembly 30 into the hook-shaped lifter holder 74 as wiper assembly 30 continues to move to the parked position 44. When wiper assembly 30 at least partially contacts lifter holder 74, wiper assembly 30 is in the parked position 44. In one embodiment, wiper lifter assembly 12 may be mounted on vehicle 10 with leading edge 76 being the furthest part of the wiper lifter assembly 12 away from ground surface 78 so the force of gravity may assist keeping the wiper assembly 30 in lifter holder 74. Ridge 110 may continue to keep wiper assembly 30 out of contact with wiper contact member 62 in the parked position 44. Wiper assembly 30 may remain in the parked position 44 until the wiper assembly 30 is activated. Once the wiper assembly 30 is activated, the process is reversed.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. A wiper lifter assembly for a vehicle comprising:
    a wiper ramp formed substantially from a first material and having an upper surface defining a ramped portion with a leading edge for lifting a wiper of an associated vehicle away from a wiping surface of the vehicle and also having at least one ridge and a hook-shaped lifter holder both spaced from said leading edge;
    a wiper contact member supported on an upper surface of the wiper ramp such that the wiper of an associated vehicle contacts a second surface of the wiper contact member before contacting any other component of the wiper lifter assembly, the wiper contact member being a cushioning layer made substantially from a second material that is softer than the first material, the second surface being one of flush with the upper surface and disposed above the upper surface, wherein the at least one ridge projects above both the upper surface and the second surface and is operable to lift the wiper of an associated vehicle away from and out of contact with the second surface and into the hook-shaped lifter holder; and
    wherein the wiper contact member includes a first layer being a contact layer defining the second surface and a second layer below the contact layer, the contact layer of the wiper contact member defining a relatively low coefficient of friction relative to the second layer to facilitate sliding of the wiper of an associated vehicle on the wiper contact member.

2. The wiper lifter assembly of claim 1, wherein the cushioning layer is formed at least in part of a foam material.

3. The wiper lifter assembly of claim 1, wherein the contact layer of the wiper contact member comprises slip tape.

4. The wiper lifter assembly of claim 1, wherein the wiper ramp defines a groove in the upper surface and the wiper contact member is located in the groove.

5. The wiper lifter assembly of claim 4, wherein the groove in the wiper ramp extends in a substantially longitudinal direction along the wiper ramp.

6. The wiper lifter assembly of claim 4, wherein the groove of the wiper ramp defines a depth and the wiper contact member defines a thickness, and wherein the thickness of the wiper contact member is greater than the depth of the groove such that the wiper contact member defines an extending thickness extending beyond the upper surface of the wiper ramp.

7. The wiper lifter assembly of claim 1 further comprising an isolation pad formed substantially from a material that is softer than the first material of the wiper ramp, the isolation pad having a first surface for contact with a surface of an associated vehicle and a second surface for contact with a lower surface of the wiper ramp.

8. The wiper lifter assembly of claim 6, wherein a ratio of the extending thickness of the wiper contact member to the thickness of the wiper contact member is greater than 0 and less than 1.

* * * * *